Figure 1:
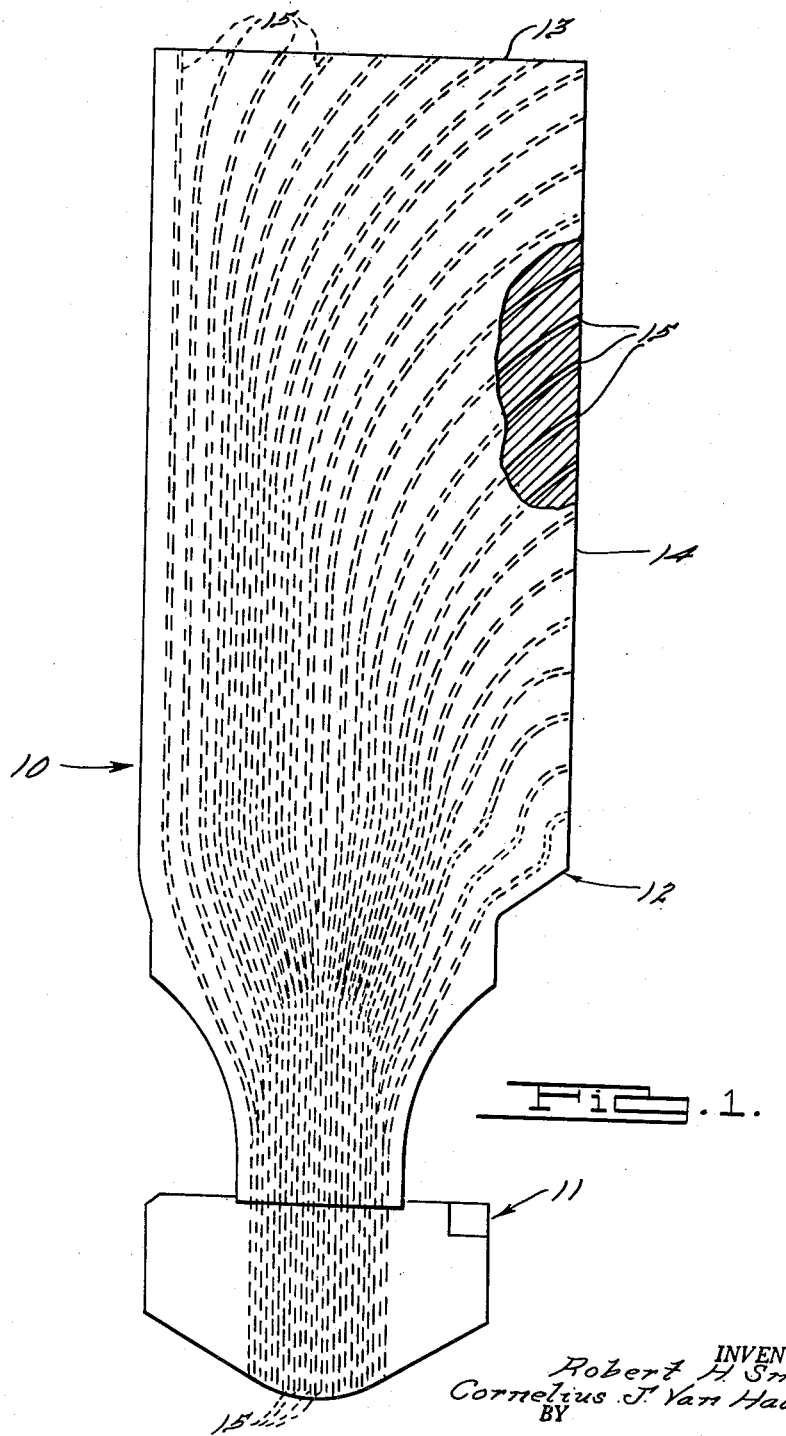

Aug. 24, 1954   R. H. SMITH ET AL   2,687,278
ARTICLE WITH PASSAGES
Filed May 26, 1948   3 Sheets-Sheet 2

INVENTORS.
Robert H. Smith.
Cornelius J. Van Haltern.
BY
Harness and Harris
ATTORNEYS.

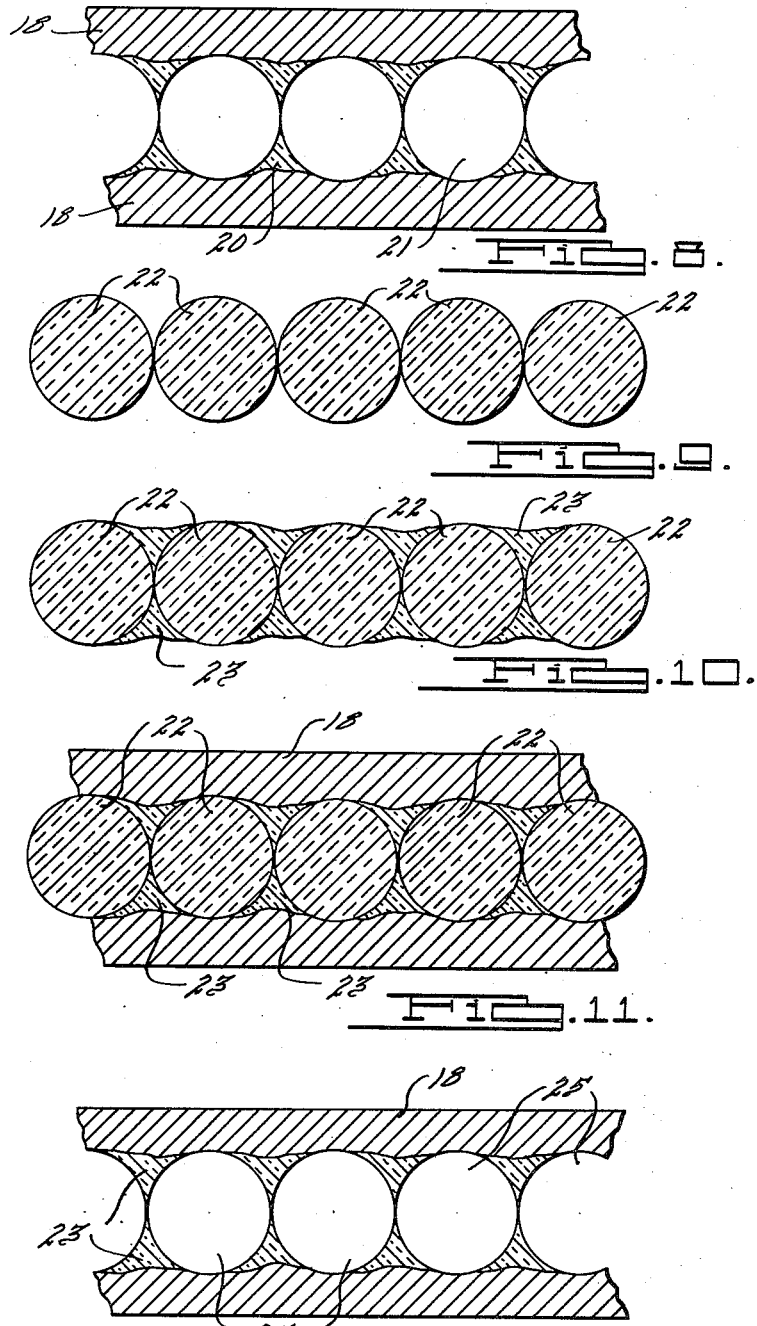

Patented Aug. 24, 1954

2,687,278

UNITED STATES PATENT OFFICE 2,687,278

ARTICLE WITH PASSAGES

Robert H. Smith and Cornelius J. Van Haltern, Detroit, Mich., assignors to Chrysler Corporation, Highland Park, Mich., a corporation of Delaware Application May 26, 1948, Serial No. 29,348

4 Claims. (Cl. 253—39.15)

The present invention relates to articles with passages formed therein and to the method for producing such articles. More specifically it relates to a turbine blade provided with cooling passages and to a process for producing the same.

An object of the present invention is to devise a method of manufacturing articles having passages therein, the production of which articles is difficult because the passages are small and may be curved. The articles in question may be turbine blades provided with small curved cooling passages.

A further object is the provision of an article having certain structurally novel features enabling it to have small passages therein. The article may be a turbine blade in which the passages are curved and serve to cool the blade.

Other objects will appear from the disclosure.

Figure 2:
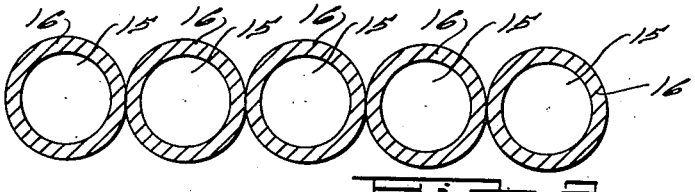
Figure 3:
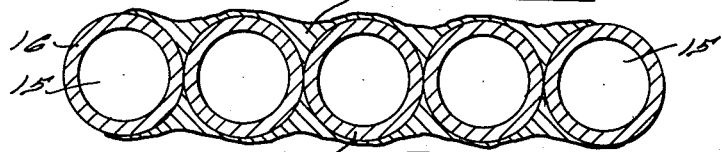
Figure 4:
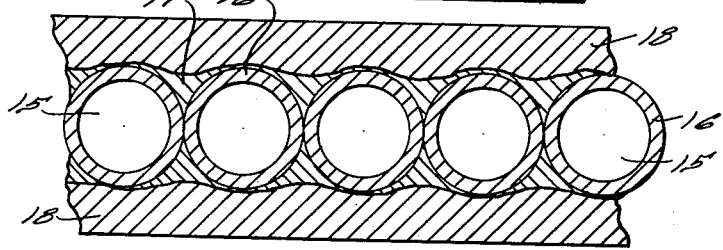
Figure 5:
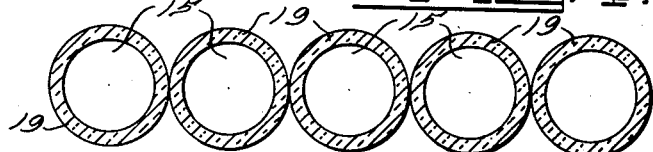
Figure 6:
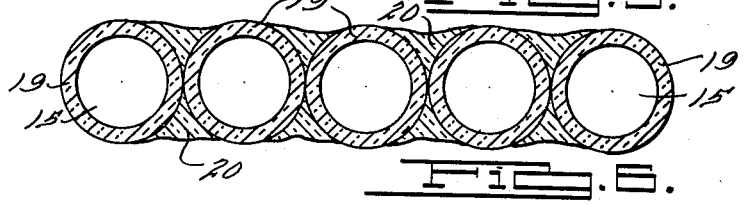
Figure 7:
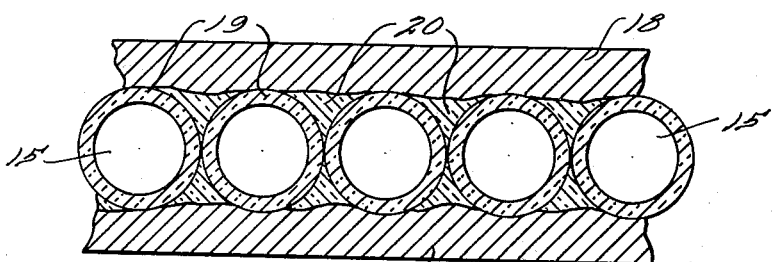

In the drawings:

Fig. 1 is a view of a turbine blade of the present invention, a part being broken away and in section;

Figs. 2, 3, and 4 are sectional views showing successive steps in the manufacture of the aforesaid turbine blade;

Figs. 5, 6, 7, and 8 are sectional views illustrating a first modified method of producing the turbine blade; and Figs. 9, 10, 11, and 12 are sectional views illustrating a second modified method of producing the turbine blade.

The turbine blade of the present invention is designated by the reference numeral 10 in Fig. 1. This blade comprises a root portion 11 and a body portion 12 having a tip 13 and a trailing edge 14. The turbine blade 10 is provided with a plurality of cooling passages 15, all of which originate in the root portion 11, some of which terminate in the tip 13, and some of which terminate in the trailing edge 14.

According to Figs. 2, 3, and 4 the passages 15 are formed of a plurality of tubes 16 which may be electroformed or of drawn metal such as nickel, molybdenum, or stainless steel. The tubes 16 are juxtaposed at one end as illustrated in Fig. 2 and are separated at the other end. The juxtaposed ends of the tubes are joined by bonding metal 17, as illustrated in Fig. 3, which may be applied by plating, brazing, welding, sintering of powdered metals, or soldering. If the bonding material is applied by plating, the metal may be one having a high melting point comparable with that of the tubes 16, such as nickel or chromium. If the bonding metal is sintered from powdered material, it may be nickel or nickel and copper. If a soldering process is employed to hold the tubes 16 together, the metal may comprise copper and nickel or chromium.

After the tubes 16 have been bonded together at one end by metal 17, as illustrated in Fig. 3, metal 18 is cast over and around the tubes in the form of the blade 10. This cast metal may be Stellite. The bonded ends of the tubes 16 held adjacent to one another extend from the root portion 11, as illustrated in Fig. 1. The tubes are held in spaced relation at their other ends by the cast metal 18 so as to cause the passages 15 formed by the tubes 16 to terminate in the tip 13 and the trailing edge 14 of the blade 10.

In the process illustrated in Figs. 5–8, inclusive, the passages 15 are formed of tubes 19, formed of a suitable non-metal such as ceramic. The tubes 19 are joined at one end by a suitable material 20, which may be a non-metallic material such as ceramic. Thereafter metal 18 in the form of a turbine blade may be cast over the ceramic tubes 19. This metal may be Stellite. The turbine blade may be used in the form shown in Fig. 7 in which the ceramic tubes 19 are left in place, or the ceramic tubes may be broken out by a process such as drilling to provide the larger passages 21 illustrated in Fig. 8.

The ceramic tubes 19 may be easily removed by chemical means such as leaching or by being broken out of the cast blade material 18 by flexible drills which follow the curves of the passages 15. The cast blade material 18 is considerably less fragile than the ceramic tubes 19 thus making it feasible to remove the ceramic cores by this method.

In the modification of Figs. 9 to 12 inclusive, solid rods 22 which may be ceramic, are substituted for the tubes or tubular rods 19 of Figs. 4 to 7 inclusive. The rods 22 are joined to one another by a suitable material 23, which may be a non-metallic material such as ceramic, as illustrated in Fig. 10. Thereafter cast metal 18, which may be Stellite, is applied over and around the rods. Finally the rods 22 are removed by chemical means, such as leaching, or by being broken out, for example, by a flexible drill, to leave the passages 25.

We claim:

1. A turbine blade widening from root to tip and comprising a plurality of curved tubes adjacent one another, bonded together at one end and curving away from one another so as to be separated at the other end, and cast metal covering the tubes, the tubes forming curved cooling passages extending through the blade, the bonded ends of the tubes being in the root portion of the blade, and the separated ends of the tubes terminating in the tip and the trailing edge of the blade.

2. A turbine blade as set forth in claim 1 wherein said tubes are formed of a ceramic.

3. A turbine blade widening from root to tip and comprising a plurality of curved tubes adjacent one another, bonded together at one end and curving away from one another so as to be separated at the other end, and cast metal covering the tubes, the tubes forming curved cooling passages extending through the blade, the bonded ends of the tubes being in the root portion of the blade, and the separate ends of the tubes terminating in the tip and the trailing edge of the blade, said tubes being formed of metal.

4. A phasic article for use in a bladed turbine and the like comprising: a gradually widening blade including a plurality of elongated curved inserts, said inserts being arranged side by side in a row and bonded together at one end and curving away from one another so as to be predeterminably spaced apart at the other end, and cast metal surrounding the inserts, said metal assuming the external form of a turbine blade of the type having a pattern of internal passages directed therethrough following a path conforming to the inserts and having a side edge, a tip edge, and another side edge, said spaced apart ends being in at least one of said edges.

References Cited in the file of this patent

UNITED STATES PATENTS

| Number | Name | Date |
|---|---|---|
| 1,765,462 | Stoney | June 24, 1930 |
| 1,982,055 | Jenkins | Nov. 27, 1934 |
| 2,074,007 | Wissler | Mar. 16, 1937 |
| 2,085,324 | Lindner | June 29, 1937 |
| 2,190,828 | Deitz | Feb. 20, 1940 |
| 2,220,420 | Meyer | Nov. 5, 1940 |
| 2,236,426 | Faber | Mar. 25, 1941 |
| 2,269,200 | Hillner | Jan. 6, 1942 |
| 2,297,446 | Zellbeck | Sept. 29, 1942 |
| 2,394,353 | Zellbeck | Feb. 5, 1946 |
| 2,470,126 | Altorfer | May 17, 1949 |
| 2,484,485 | Brickman | Oct. 11, 1949 |
| 2,502,337 | Moir | Mar. 28, 1950 |

FOREIGN PATENTS

| Number | Country | Date |
|---|---|---|
| 376,974 | Great Britain | July 21, 1932 |
| 594,931 | Germany | Mar. 23, 1934 |
| 705,976 | Germany | May 15, 1941 |
| 878,999 | France | Nov. 2, 1942 |